July 23, 1957 W. E. SHENK 2,800,561
CONTINUOUS WELDING BY HIGH FREQUENCY INDUCTION METHODS
Filed May 27, 1954

INVENTOR
WILLIAM E. SHENK

BY *Francis J. Klempay*
ATTORNEY

United States Patent Office 2,800,561
Patented July 23, 1957

2,800,561

CONTINUOUS WELDING BY HIGH FREQUENCY INDUCTION METHODS

William E. Shenk, Hubbard, Ohio, assignor to McKay Machine Company, Youngstown, Ohio, a corporation of Ohio Application May 27, 1954, Serial No. 432,733

3 Claims. (Cl. 219—8.5)

This invention relates to the art of continuously welding longitudinal seams for the production of pipes, tubes and similar products, and is more particularly concerned with longitudinal seam welding by electric induction methods.

In apparatus of the general kind involved herein, commonly termed electric induction tube mills, it has been common practice to so position the induction coil in relation to the open cleft of the tube stock and to the point of contact or closure of the opposing edges of the tube stock that currents induced in the stock travel along the opposing side edges of the strip stock toward and away from the point of contact or closure to thereby heat the surfaces of such edges to welding temperature. Thus, in British specification #377,655 of 1931 and in French Patent #972,849 there is illustrated and described induction mills in which the induction coil consisting of a few turns surrounds the formed but open tube stock immediately ahead of the pressure or welding rolls which closes the tube thereby causing the heated edges of the stock to contact and weld together. These disclosures teach quite clearly the flow of the induced welding current along the outer surfaces of the opposing edges of the stock with the current passing around the vertex of the slit between the edges. The electrical power frequency applied to the coil may, of course, be of any desired value—it being well understood from the electric induction heating art that the higher the frequency employed the more restricted will be the current and heating effects to the exposed outer surfaces of the workpiece. Thus, in welding aluminum, for example, it is desirable to employ high frequencies of the order of 400 kc. in order that welding temperatures and consequent loss of metal strength will be restricted very closely to the exposed surfaces of the edges, making it possible to effect sound continuous welds without excessive flash or displacement of molten metal from the general geometric figure of the strip stock.

Regardless of the frequency employed, the path or circuit of the induced welding currents in the region of the converging edges of the workpiece is such that arcing occurs variably adjacent to the point of contact or closure of the edges. This results from the potential or IR drop along the edges of the material, occasioned by the resistance of the material.

In the practice of the prior art this arcing or flashing near the apex of the V can be detrimental and undesirable for the reason that the arc tends to be highly unstable so that the effects thereof are not uniform. Particularly, in this respect, I have observed a phenomena known as the "horn gap effect" in which an arc, when struck between divergently related conductors, will move outwardly along the conductors, in the direction of the divergency. The arc will continue to move, moreover, until the air gap between the conductors becomes so large that the potential between the conductors will not sustain the arc, whereupon it is extinguished and immediately restarted adjacent the apex of the V.

Generally, in the practice of prior art methods, unstabilized arcing adjacent the point of the weld results in inferior if not unsatisfactory welding results, as well as a product of poor appearance, the fluctuations of the arc usually being clearly visible on the surface of the tubing.

Accordingly, it is the overall object of the present invention to improve upon heretofore known methods of welding tubes and the like by high frequency induction processes to the end that arcing conditions are stabilized and improved whereby a product of improved quality and appearance is obtained.

Another object of the invention is the improvement of arcing or flashing characteristics in high frequency induction welding processes in a highly simplified and economical manner whereby the method of my invention may be satisfactorily carried out on a commercial scale, and whereby the improved aspects of the method may be readily realized by appropriate modification of the method or methods now employed in existing commercial tube-making installations.

The above and other objects and advantages of the invention will become apparent upon full consideration of the following detailed drawing and accompanying specification wherein is shown a preferred means for carrying out the method of my invention.

Figure 1:
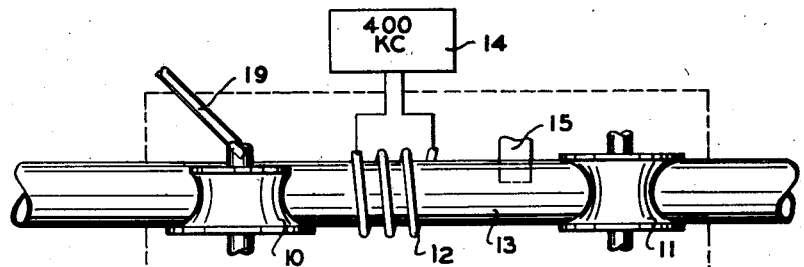
Figure 1 is a simplified fragmentary view of a high frequency electric induction tube-making mill used in practicing the improved method of my invention.

Referring now to the drawing, the numerals 10 and 11 designate rolls of a tube-making mill which are positioned forwardly and rearwardly respectively of an inductor coil 12. The coil 12 comprises a few turns of suitable conductor material positioned in close proximity to an unwelded tube 13 and connecting a source of high frequency alternating current power 14. In the present invention the power source 14 may be in the order of 400 kilocycles per second.

In a complete tube mill there are of course provided a plurality of forming rolls, not shown, which progressively form strip material into tube-like form. Following the forming rolls, in the direction of travel of the tubing, are closing rolls which do not substantially deform the tube but which merely align the spaced edges thereof and bring the same into contact for welding. Thus, in the illustration of Figure 1, rolls 10 and 11 are closing rolls, the first pair of rolls 11 serving to align and partially close the edges of the tube while the second pair of rolls 10 actually bring the edges into contact for welding.

Adjacent the first pair of rolls 11 is a spacer and seam guide 15 which is a blade-like member which is inserted between the partially closed side edges of the tube, adjacent the first rolls 11, to maintain a predetermined uniform separation between the edges as well as to maintain the alignment of the edges or "seam" of the tube.

Figure 3:
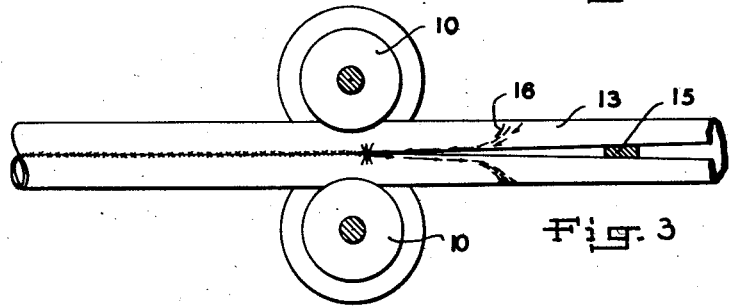
Figure 3 is a fragmentary top plan view of the apparatus of Figure 1.

All of the foregoing apparatus is more or less conventional, and in a conventional welding operation the tube blank 13 moves from left to right in Figure 1, during which time the inductor coil 12 is energized with 400 kc. power from the source 14. When the coil 12 is thus energized currents are induced in the tube blank 13 which tend to flow circumferentially therein. However, as the edges of the tube blank are caused to close at a point spaced from the coil 12 the currents tend to travel along the edges of the blank, to and from the point of closure. Thus, in Figure 3 the approximate current distribution is schematically illustrated by arrows 16, and it will be observed that adjacent the inductor coil 12 the current flows circumferentially about the lower side of the tube blank and in a rather concentrated manner along the opposed edges of the blank to the apex of the V defined by the converging edge portions. Since the current is rather widely distributed about the lower side of the tube blank this portion of the tube is not heated to any substantial degree. However, along the converging edge portions the current concentrates along the extreme inside portions of the blank so that the edges only are brought up to welding temperature. Such concentration is caused by two primary factors: "proximity effect" whereby the oppositely directed currents in the adjacent edge portions of the tube blank tend to move toward each other and to thereby crowd along the extreme edge of the material; and "skin effect" wherein the currents, by reason of the high frequency alternation thereof, tend to crowd to the outer surface or skin of the conductive material.

Figure 4:
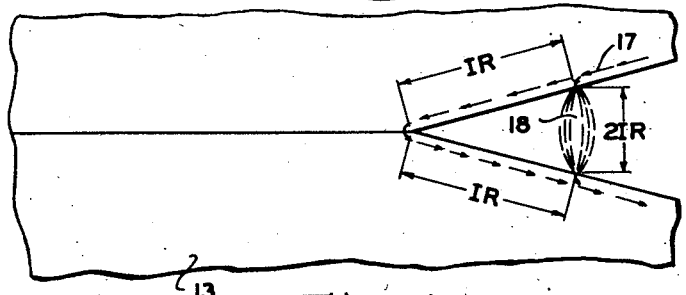
Figure 4 is an enlarged and exaggerated fragmentary view of a section of tubing being welded.

Referring now to Figure 4 the current flow adjacent the apex of the V formed by the converging edge portions of the tube blank is represented by arrows 17, and it will be understood that such current may be confined to the extreme edge layers of the material—for example, the currents may be confined substantially to an outer layer about 0.001 or 0.002 inch in thickness. The currents being confined to such a small area of the conductor, there is caused to be a considerable loss of potential along the linear extent of the edge portions, which loss of potential is represented graphically in Figure 4 by the letters "IR," "I" representing the total current flow and "R" representing the resistance to such flow. Thus, at any point along the V opposite portions of the tube blank have a potential difference approximately equal to 2IR. The potential drop IR will, of course, not be strictly linear since the proximity effect becomes more pronounced toward the apex of the V. Therefore, at some point adjacent the apex of the V the potential difference 2IR may be sufficient to cause an arc to jump across the seam gap, substantially in the manner shown at 18 in Figure 4. Such arcing in itself is not necessarily undesirable. In fact it may be of some positive value. However, it has been my experience that when the arc is initiated, through a phenomena known as the "horn gap effect" the arc travels along the V in the direction of divergence of the side edges thereof until the gap is so great that the arc can no longer be sustained, whereupon the arc extinguishes and reforms in its initial position adjacent the apex of the V. This unpredictable behavior of the arc is undesirable in that welding results are not uniform and not in all cases satisfactory, and this is readily apparent upon visual inspection of the tube.

Generally, the welding of aluminum, for example, and similar materials in the manner stated is carried out in a nonoxidizing atmosphere to avoid the formation of oxide scales on the surfaces to be joined. I have found that argon or similar inert gases are quite satisfactory for this purpose. However, even in the presence of an argon atmosphere, for example, the effects of unstable arcing conditions are highly undesirable, and further steps or provisions are necessary in order to insure uniformly satisfactory results.

Having determined that unstable arcing conditions result in part at least from the horn gap phenomena, wherein the arc tends to move in the direction of divergence of the side edges of the tube blank I proposed to increase the angle of divergence of the side edges whereby the distance that the arc can travel before being extinguished is decreased; that is, as the arc moves outwardly of the apex of the V the gap between the side edges increases rapidly to a point where arcing cannot be sustained. Of course, good tube forming practice places a practical limit upon the angle of divergence of the side edges of the tube blank, and moreover, the proximity effect is lessened as the angle of divergence is increased, placing a further practical limit upon the maximum angle which may be satisfactorily used. My experimentations have shown that an angle of approximately 2.8 degrees is satisfactory, and this may be obtained by positioning a seam guide and spacer 15 of one-quarter inch thickness about five inches ahead of the point of closure of the side edges of the tube blank. This, I have found, improves the quality of the welded tubular product by reducing unstable arcing conditions. However, the results are not entirely satisfactory, even with this improvement.

Further experiments for the purpose of improving welding results have resulted in the discovery that the addition to the argon gas, used as a non-oxidizing atmosphere, of a small percentage of hydrogen gas, resulted in surprising and unexpected arc stabilization whereby an entirely satisfactory welded product was obtained. The addition of about five percent of hydrogen to the inert atmosphere substantially stabilized the arc at a point closely adjacent the apex of the V. It is not clearly understood, at this time, the exact reason or theoretical basis for the results obtained since it is difficult, if not impossible, to observe the exact behavior of the arc under actual welding conditions. However, upon the addition of hydrogen to the inert atmosphere, as aforesaid, uniform and consistently satisfactory welds were produced, whereas theretofore such results had been unobtainable.

Figure 2:
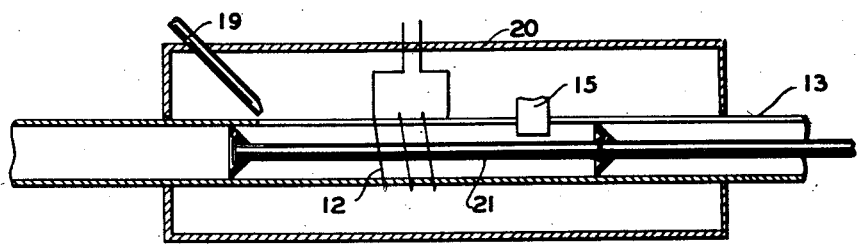
Figure 2 is a section view of the apparatus shown in Figure 1.

Referring again to Figure 2, there is shown a gas discharge tube 19 having an outlet positioned over the apex of the V formed by the converging side edges of the type, and arranged to direct a stream of inert gas over the area of the weld, the gas including a portion of hydrogen, in accordance with the improved method of the invention. The tube 19 is directed oppositely to the direction of travel of the tube 13 so that the accumulation of flash particles about the tube is minimized.

To conserve the gaseous atmosphere as much as possible a suitable enclosure 20 may be provided about the tube 13 and closing rolls 10 and 11, and if desired, suitable means 21 may be provided interiorly of the tube to minimize the escape of gas therethrough.

Preferably the hydrogen gas is mixed with the argon or other inert gas prior to discharge from the nozzle 19. However it is anticipated that other arrangements might be satisfactorily employed.

It should thus be apparent that I have accomplished the objects initially set forth. The invention, though not clearly understood on a theoretical basis, is productive of unexpectedly superior welding results. It is believed that the addition of hydrogen gas to the inert bathing atmosphere otherwise provided substantially stabilizes the arcing or flashing which occurs adjacent the point of closure of the strip edges so that such arcing uniformly effects the welding process at all times and may be accurately predicted and accounted for in effecting precise adjustments of the welding equipment.

Having thus described my invention, what I claim as new and desire to secure by issuance of United States Letters Patent is:

1. In a process for the continuous electric resistance welding of tubes by inducing high frequency electrical currents therein and causing said currents to travel longitudinally along the spaced converging side edges of the tube blank and to cross from one side edge to the other adjacent the point of convergence of said side edges; the improvement in said process which consists of carrying out said welding in a gaseous medium comprising a mixture of an inert gas and hydrogen whereby any arc between said side edges is suppressed and caused to be confined closely adjacent the apex of said side edges, and said side edges are caused to converge at such an angle whereby any arc cannot sustain itself if it moves outwardly from said apex.

2. In a process for the continuous electric resistance welding of tubing by inducing high frequency electrical currents therein and causing said currents to travel longitudinally along the spaced converging side edges of the tube blank and to cross from one side edge to the other adjacent the point of convergence of said side edges, and wherein said welding is carried out in a non-oxidizing gaseous medium; the improvement in said process which consists of carrying out said welding in a gaseous medium comprising an inert gas and hydrogen, and said side edges are caused to converge at an angle of substantially 2.8 degrees.

3. The process according to claim 2 wherein said gaseous medium is introduced to the area of welding adjacent said point of convergence in a direction opposite to the direction of travel of said tube blank.

References Cited in the file of this patent

UNITED STATES PATENTS

| | | |
|---|---|---|
| 2,602,871 | Noland et al. | July 8, 1952 |
| 2,647,981 | Wogerbauer | Aug. 4, 1953 |
| 2,649,527 | Chapman et al. | Aug. 18, 1953 |
| 2,762,892 | Park | Sept. 11, 1956 |